Dec. 5, 1933.  W. E. UMSTATTD  1,937,733
ROLLER BEARING
Filed Oct. 28, 1932
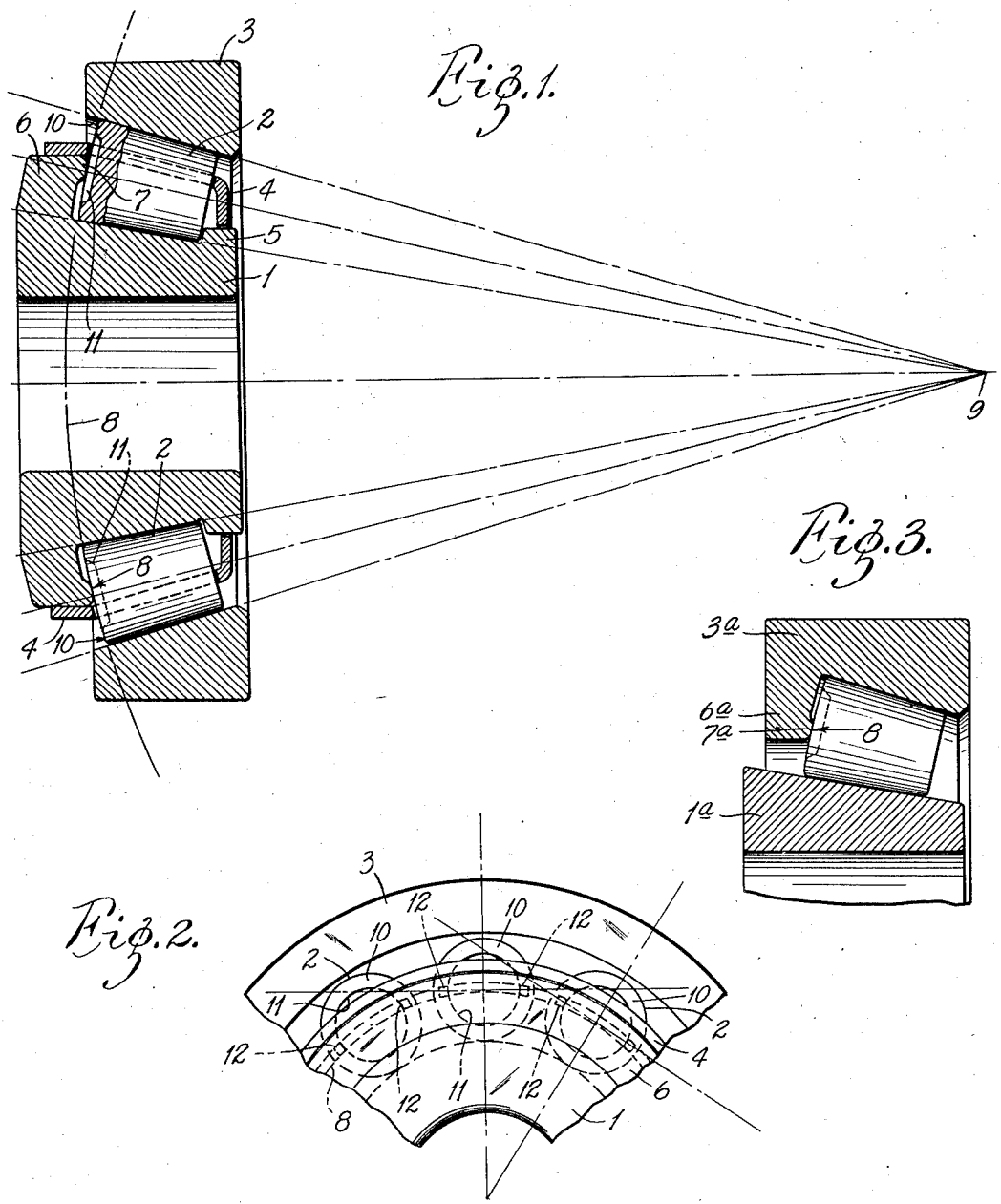
INVENTOR
William E. Umstattd
HIS ATTORNEYS Patented Dec. 5, 1933

1,937,733

UNITED STATES PATENT OFFICE 1,937,733

ROLLER BEARING

William E. Umstattd, Canton, Ohio, assignor to The Timken Roller Bearing Company, Canton, Ohio, a corporation of Ohio Application October 28, 1932. Serial No. 639,948

4 Claims. (Cl. 308—214)

My invention relates to roller bearings, particularly taper roller bearings of the type wherein the rollers are guided by contact at two spaced points with the thrust rib of one of the bearing members. It has for its principal objects a bearing of this type that minimizes the friction, reduces the unit pressure, improves lubrication and minimizes cutting and scuffing of the roller ends and the thrust rib. The invention consists principally in a construction wherein the rollers have spherically convex contact bands around their ends and wherein the thrust rib is provided with a correspondingly concave annular zone that contacts with the spherical bands of the rollers.

The invention further consists in the roller bearing and in the parts and combinations and arrangements of parts hereinafter described and claimed.

In the accompanying drawing,

Fig. 1 is a sectional view of a roller bearing embodying my invention,

Fig. 2 is a partial end view thereof, and

Fig. 3 is a partial sectional view of a modification.

In the drawing is illustrated a cone or inner bearing member 1, an annular series of conical rollers 2 thereon, a cup or outer bearing member 3 and a cage 4 for said rollers.

The cone 1 is provided with a retaining flange 5 at its small end and with a thrust rib 6 at its large end. Said thrust rib 6 is provided with a projecting portion 7 at its upper or outer end that has a spherically concave contact zone 8, the center of curvature thereof being at the common apex 9 of the conical rollers on the axis of the bearing. The large end of each roller is provided with an annular contact band 10 around its peripheral portion, said band 10 being of spherically convex curvature with the same radius and center of curvature as the concave zone of the thrust rib. The portion 11 of the roller end inside said band is depressed so as not to contact with the thrust rib 6.

By reason of the contact portion 8 of the thrust rib 6 projecting beyond the face of the main body of the rib, the rollers having contact bands 10 and the mating spherical curvatures of the thrust rib and the contact bands, the contact between each roller and the thrust rib is in the form of two spaced areas. This spaced areal contact provides accurate positioning and alining means for the rollers. At the same time, the unit pressure on the rollers and the thrust rib is quite low in contrast with the high unit pressure of the usual two point contact as set forth in Neal Patent No. 1,258,634 dated March 5, 1918. The surface contact has the further advantage of improving the lubrication and eliminating the cutting and scuffing of the roller ends and of the thrust rib. The cage is guided on the thrust rib and the flange of the cone, thus preventing it from having a misalining effect on the rollers. By varying the width of the contact bands of the rollers and the height and thickness of the contact zone of the thrust rib, the sizes of the contact areas may be changed, thus making it possible to meet the requirements of bearings for various purposes.

In the modification, the cone 1a is made in the form of an ordinary plain bearing cone; and the cup 3a is provided with a thrust rib 6a which is provided with a projecting portion 7a at its lower end that has the spherically concave contact zone 8 for cooperating with the contact band of the rollers.

What I claim is:

1. A taper roller bearing comprising an inner bearing cone, an outer bearing cup and conical rollers therebetween, each of said rollers having an annular peripheral band on its larger end, a portion of said band having a spherically convex curvature and one of said bearing members having a thrust rib provided with an annular contact zone of spherically concave curvature, said roller bands and said thrust rib having the same radius of curvature, thereby forming mating spherical surfaces.

2. A roller bearing comprising an inner bearing cone having an upstanding rib at its larger end, said rib having a projecting outer peripheral portion, the face of said projecting portion including an annular zone of spherically concave curvature, the center of curvature being on the axis of the bearing and a series of conical rollers on said bearing cone, the larger ends of said rollers being provided with annular contact bands thereon, said bands each having a portion of spherically convex curvature to mate with the concave surface of said thrust rib.

3. A roller bearing comprising a conical bearing cone having an upstanding rib at the larger end of its raceway, the face of said rib including an annular zone of spherically concave curvature, the center of curvature being on the axis of the bearing, a series of conical rollers on said bearing member having their apices at the center of curvature of said thrust rib, the larger ends of said rollers being provided with annular contact bands thereon, said bands each having a portion of spherically convex curvature to mate with the concave surface of said thrust rib.

4. A roller bearing comprising an outer bearing cup having an annular thrust rib at its smaller end, said rib having a projecting inner peripheral portion, the face of said projecting portion including an annular zone of spherically concave curvature, the center of curvature being on the axis of the bearing, and a series of conical rollers mounted in said bearing cup, the larger ends of said rollers being provided with annular contact bands thereon, said bands each having a portion of spherically convex curvature to mate with the concave surface of said thrust rib.

WILLIAM E. UMSTATTD.